J. FISHER.
Shaft of Screw Propellers.
No. 231,553.  Patented Aug. 24, 1880.
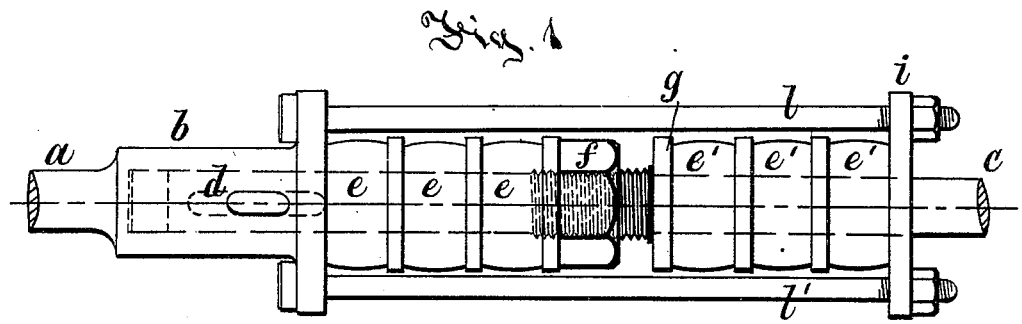
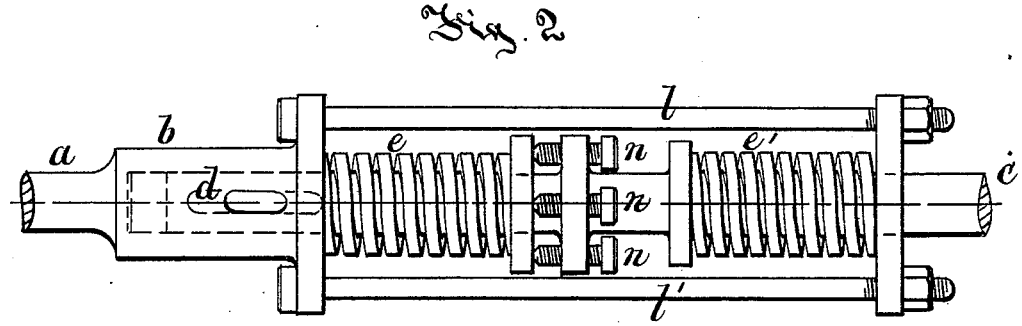
Witnesses.
Edmund Edwards
Inventor.
John Fisher

UNITED STATES PATENT OFFICE.

JOHN FISHER, OF LONDON, ENGLAND.

SHAFT OF SCREW-PROPELLERS.

SPECIFICATION forming part of Letters Patent No. 231,553, dated August 24, 1880.

Application filed January 16, 1880.

*To all whom it may concern:*

Be it known that I, JOHN FISHER, of London, England, have invented certain new and useful Improvements in the Shafts of Screw-Propellers; and I do hereby declare that the following is a full, clear, and exact description thereof, reference being had to the accompanying drawings, making part of this specification.

My invention relates to certain new and useful improvements in the shafts which drive the screw-propellers in steamships or other vessels, by which an elastic connection is introduced between the screw-propeller and the engine, so that there is less vibration and jarring than is ordinarily the case, and when the screw is set in motion or stopped or affected by the movements of the vessel in the water there is less liability of injury to the screw or to the driving machinery.

In the accompanying drawings, Figure 1 is a view of a screw-propeller shaft according to my invention having an elastic connection of india-rubber, and Fig. 2 is a similar shaft having a steel spring-connection.

$a$ is the driving-shaft from the engine, having its end at $b$ of larger diameter and hollow, so that the end of the screw-shaft $c$ can fit into it. A slot is shown through both shafts at $d$, a transverse key being fitted into the outer shaft, $b$, and the slot in inner shaft, $c$, being sufficiently long to allow the latter shaft to slide backward and forward inside the part $b$.

In Fig. 1, $e\ e\ e$ are blocks or disks of india-rubber, separated by washers or plates and compressed by means of the nut $f$, which is screwed upon the shaft $c$. Corresponding blocks or disks of india-rubber $e'\ e'\ e'$ are compressed between the flange $g$ upon $b$ and the loose plate $i$ by means of two or more bolts and nuts, $l\ l'$.

In Fig. 2, instead of the india-rubber blocks $e\ e\ e$, a helical metal spring is shown at $e$, compressed by means of the screws $n\ n\ n$, and instead of the blocks $e'\ e'\ e'$ a corresponding metal spring is shown at $e'$.

It will be seen that when the driving-shaft $a$ is made to revolve for the purpose of propelling the vessel ahead the blocks of india-rubber $e\ e\ e$, Fig. 1, or the metal spring $e$, Fig. 2, are compressed, and the work of the screw-propeller is transmitted to the vessel through them, and when the vessel is propelled astern the blocks $e'\ e'\ e'$, Fig. 1, or the metal spring $e'$, Fig. 2, are compressed, the work of the screw-propeller being then transmitted to the vessel through them instead of through those first described.

If it is only desired to provide an elastic connection when the vessel is being propelled ahead, the blocks of india-rubber $e'\ e'\ e'$ in Fig. 1, or the spring $e'$ in Fig. 2, and the bolts and nuts $l\ l'$, may be omitted.

My invention, as shown in the drawings, is especially applicable to small vessels; but where it is to be applied to larger vessels, where great power has to be transmitted through the elastic connection, several sets or series of springs similar to those shown may be arranged round the shafts; and in similar circumstances, instead of the transverse key and slots through the shafts, as shown, one or more longitudinal sliding keys may be used, and I fix a strong driving-disk upon the engine-shaft opposite and parallel to a similar disk upon the screw-shaft, (the end of which enters a hollow socket in the former, as in the arrangement first described,) and projecting from the surface of the former disk I arrange two or more plates at right angles to its surface and interlocking with corresponding parallel plates upon the disk on the screw-shaft. Between the sets of projecting plates I arrange one or more friction-rollers having their axes radial and parallel with the disks. Upon one or both of the projecting plates, between which the rollers are fitted, I fit plates of hard wood or other sufficiently elastic material, over which are again fixed plates of iron or steel or other hard metal, against the surface of which the friction-rollers act. By this means the screw-shaft can move endwise when necessary, as first described, with little friction, while the power of the engine-shaft is transmitted through the rollers to the screw-shaft, with the intervention of the elastic plates, which absorb part of the vibration arising from the torsional action of the driving-shaft upon the screw-shaft.

By my invention, when the engine is first set in motion part of the power which is ordinarily expended in beating the water with the blades of the screw is used to compress the springs, the screw, with its shaft, moving longitudinally, and in the same way the shocks and blows and irregular movements caused by the action of the waves upon the screw are lessened and prevented, the action of the engine upon the screw being thus equalized and the chance of injury to the propelling machinery being also lessened, while greatly-increased comfort is experienced by passengers in vessels so fitted.

Having now described my invention, what I claim as new, and desire to secure by Letters Patent, is—

The combination of the slotted driving-shaft $a$, slotted screw-shaft $c$, key fitted into the outer shaft and inner shaft, and the elastic springs $e\ e\ e$ and $e'\ e'\ e'$, as and for the purposes described.

In testimony whereof I have signed my name to this specification in the presence of two subscribing witnesses.

JOHN FISHER.

Witnesses:
EDMUND EDWARDS,
ARTHUR E. EDWARDS.